United States Patent [19]

Voigts

[11] Patent Number: 5,688,308
[45] Date of Patent: Nov. 18, 1997

[54] ELECTROSTATIC AIR CLEANING SYSTEM WITH AIR FLOW SENSOR

[75] Inventor: Ronald D. Voigts, Cary, N.C.

[73] Assignee: Trion, Inc., Sandford, N.C.

[21] Appl. No.: 452,715

[22] Filed: May 30, 1995

[51] Int. Cl.[6] .................................................... B03C 3/68
[52] U.S. Cl. ........................... 96/18; 55/274; 55/DIG. 34; 95/4; 95/14; 95/23; 95/25; 96/19; 96/26
[58] Field of Search .................................. 96/19, 26, 18; 95/4, 14, 23, 6, 25; 55/274, DIG. 34

[56] References Cited

U.S. PATENT DOCUMENTS

| | | | |
|---|---|---|---|
| 2,189,614 | 2/1940 | Penney | 96/19 |
| 2,310,786 | 2/1943 | Hildebrand | 96/26 |
| 2,756,839 | 7/1956 | Roberts | 96/18 |
| 3,504,482 | 4/1970 | Goettl | 55/274 X |
| 3,577,705 | 5/1971 | Sharlit | 55/302 X |
| 3,630,000 | 12/1971 | Mullings | 96/81 |
| 3,654,747 | 4/1972 | Remick | 55/525 X |
| 3,740,926 | 6/1973 | Duval | 96/26 |
| 3,802,159 | 4/1974 | Ferdelman | 96/82 |
| 3,989,486 | 11/1976 | Baysinger | 55/270 X |
| 4,140,498 | 2/1979 | Krause | 55/480 X |
| 4,290,788 | 9/1981 | Pittman et al. | 55/481 X |
| 4,318,152 | 3/1982 | Weber | 96/26 X |
| 4,341,537 | 7/1982 | Rodgers | 55/274 X |
| 4,382,433 | 5/1983 | Hess et al. | 126/113 |
| 4,624,685 | 11/1986 | Lueckenotte | 323/903 X |
| 4,686,450 | 8/1987 | Pichat | 323/282 |
| 4,806,132 | 2/1989 | Campbell | 95/12 |
| 4,987,839 | 1/1991 | Krigmont et al. | 110/345 X |
| 5,035,728 | 7/1991 | Fang | 96/19 |
| 5,232,478 | 8/1993 | Farris | 96/26 |
| 5,332,425 | 7/1994 | Huang | 96/26 |
| 5,456,742 | 10/1995 | Glenn et al. | 55/274 X |

*Primary Examiner*—Richard L. Chiesa
*Attorney, Agent, or Firm*—Burns, Doane, Swecker & Mathis LLP

[57] ABSTRACT

The electrostatic air cleaning system is mounted in a duct of a residential or commercial heating and cooling system to remove particles from the circulating air. The electrostatic air cleaning system includes an air flow sensor which turns the air cleaner off in response to the lack of air flow through the air duct. An air flow sensor circuit connected to the electrostatic air cleaner includes a thermistor which detects the lack of air flow in the duct and provides a signal in response to lack of airflow. The signal from the sensor causes the power supply to the electrostatic air cleaner to be disconnected when there is insufficient air flow through the air duct. The air flow sensor circuit is configured so that power will continue to be supplied to the electrostatic air cleaner from the power supply when the sensor is disabled for a variety of reasons. In this way, the electrostatic air cleaning system addresses the problems of the prior art by providing an air cleaning system with an air flow responsive sensor in which the disabling of the sensor does not deactivate the electrostatic air cleaner.

18 Claims, 1 Drawing Sheet

ELECTROSTATIC AIR CLEANING SYSTEM
WITH AIR FLOW SENSOR

BACKGROUND OF THE INVENTION

1. Field of the Invention

The invention relates to an electrostatic air cleaning system having an air cleaner or electrostatic precipitator and an air flow sensor, and more particularly, to an electrostatic air cleaning system having a air flow sensor which turns off the air cleaner in the absence of air flow through the electrostatic precipitator.

2. Description of the Related Art

Air cleaners, such as electrostatic precipitators, are frequently installed in air ducts of commercial and residential heating and cooling systems. In these heating and cooling systems, air is intermittently circulated through the ducts by a blower as necessary to achieve the required heating or cooling.

Known electrostatic precipitators operate by application of high voltages to an ionizing grid and collector plates within the precipitator. The ionizing grid provides a charge to the particles of air pollutants which are passing through the precipitator. The charged particles are then collected by the collector plates and removed from the air flow. However, the high voltages which are applied to the ionizing grid and collector plates cause the conversion of some oxygen in the air ducts to ozone. If the high voltages are applied for considerable periods of time when there is little or no air flow through the ducts, ozone accumulates in the ducts and results in an objectionable odor when air flow is resumed.

To avoid this objectionable odor air cleaners such as the one disclosed in U.S. Pat. No. 3,989,486 have been provided which incorporate an air flow responsive power switch. This air flow responsive power switch turns the electrostatic air cleaner on and off in response to air flow through the duct. The air flow responsive switch may be mechanical as shown in U.S. Pat. No. 3,504,482 or temperature sensitive as shown in U.S. Pat. No. 3,989,486.

In some newer heating and cooling systems, a control system is provided by which an electrostatic air cleaner can be connected directly to the power supply for the heating system blower. In these newer systems, called direct control systems, the control system turns the air cleaner on and off at the same time as the blower. Therefore, there is no need for an air flow sensor. However, in known electrostatic air cleaners having air flow sensors, the sensor must be connected to the power supply in order for the air cleaner to operate.

An additional disadvantage of the known electrostatic air cleaner systems is that if the air flow sensor electronics malfunction, they will not send a signal to activate the electrostatic air cleaner and the cleaner will not operate. Therefore, there is a need for an electrostatic air cleaner which will operate when the air flow sensor is disabled due to disconnection, malfunction or removal.

SUMMARY

There is therefore a need for an electrostatic air cleaner which can be operated with the air flow sensor either connected to or disconnected from the power supply so that the same air cleaner may be installed in all types of heating and cooling systems including direct control systems and non-direct control systems. The electrostatic air cleaning system according to the present invention addresses the problems of the prior systems by providing an air cleaning system with an air flow responsive sensor in which the disabling of the sensor does not deactivate the air cleaner.

According to one aspect of the present invention an electrostatic air cleaning system is provided which includes an electrostatic air cleaner configured to be positioned in an air duct of a heating or cooling system for ionizing and collecting particles in an air stream passing through the air duct and an air flow sensor circuit. The air flow sensor circuit includes a sensor which provides a signal in response to lack of airflow through the air duct. The air flow sensor circuit also includes a switch connected to a power supply which turns off the power supply to the electrostatic air cleaner in response to the signal provided by the sensor. The air flow sensor circuit is configured so that power will continue to be supplied to the electrostatic air cleaner from the power supply when the sensor is disabled.

BRIEF DESCRIPTION OF THE DRAWING FIGURE

The invention will be described in greater detail with reference to the accompanying drawing, wherein:

FIG. 1 is a diagrammatic illustration of an air flow sensor and control circuit according to the present invention.

DETAILED DESCRIPTION OF THE PREFERRED EMBODIMENT

Figure 1:
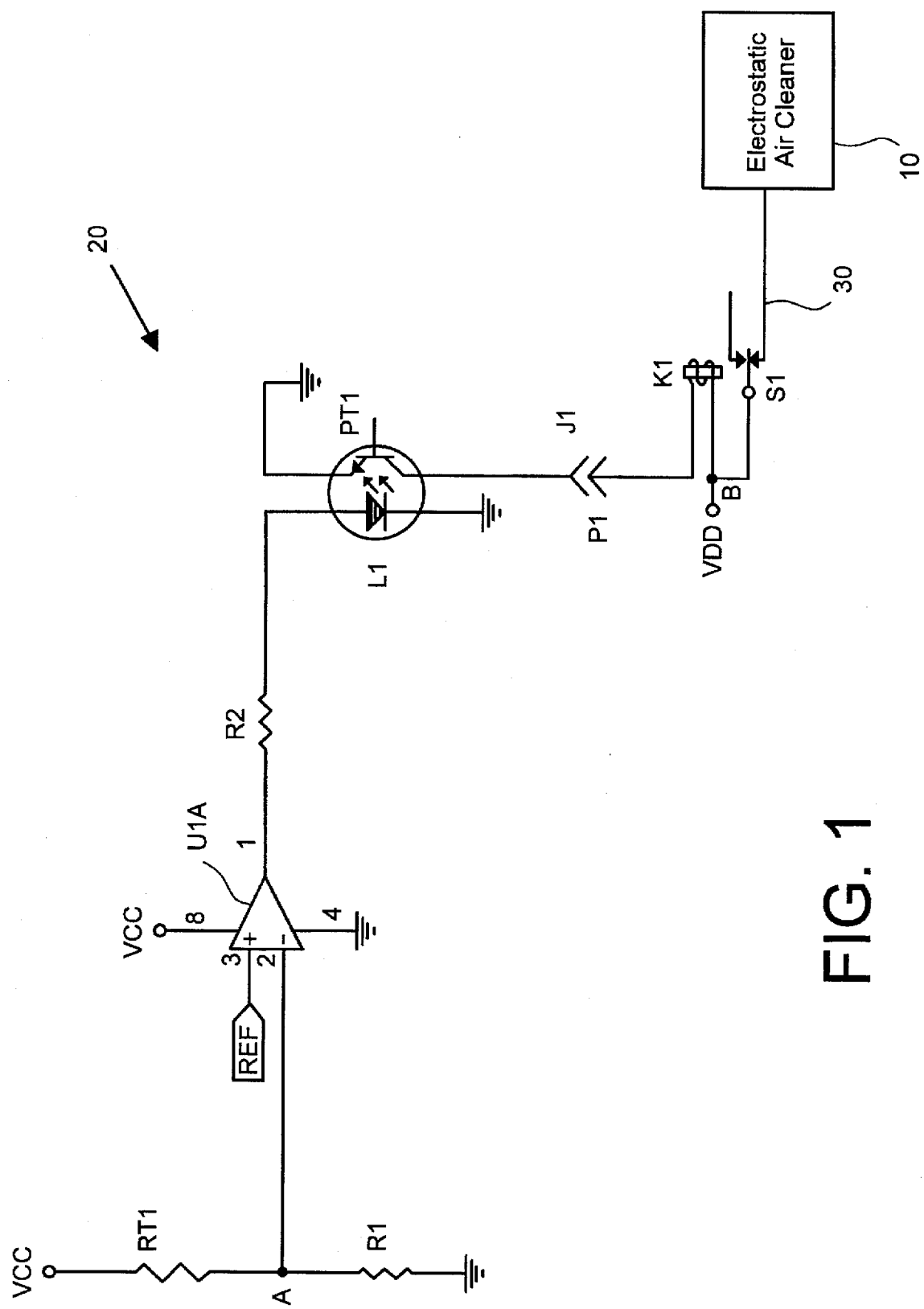

The electrostatic air cleaner system of the present invention includes an air flow sensor circuit 20 for turning on and off an electrostatic air cleaner 10 in response to the presence or absence of air flow through the air cleaner system. The electrostatic air cleaner of the present invention may be any known electrostatic air cleaner for use in residential or commercial heating and cooling systems. Acceptable electrostatic air cleaners include those disclosed in U.S. Pat. Nos. 4,290,788 and 3,989,486 which are incorporated herein by reference.

The air flow sensor circuit 20 according to the present invention is used to activate the power supply to the electrostatic air cleaner when air flows through the duct in which the air cleaner is mounted and to deactivate the power supply to the air cleaner when the air flow falls below a predetermined level. The air flow sensor according to the present invention provides the advantage that if the sensor is disabled, such as by disconnection, unplugging or malfunction, the air cleaner will continue to function.

The air flow sensor circuit 20 includes a thermistor RT1 which is preferably positioned within the electrostatic air cleaner system directly in front of a small opening or hole from the air cleaner to the outside ambient air. When air flows through the electrostatic air cleaner system a low pressure area is created in the air cleaner by the venturi effect. This low-pressure draws air from the outside of the air cleaner through the opening and cools the thermistor RT1.

Alternatively, the thermistor RT1 may be positioned inside the duct in which the electrostatic air cleaner is located. The thermistor RT1 is preferably a PTC thermistor. A resistor R1 is connected to the thermistor RT1 at point A. A voltage $V_{CC}$ is applied to the thermistor RT1. A current flows through the thermistor RT1 and the resistor R1. The current causes the thermistor RT1 to heat up, increasing its resistance and thus limiting the current flow through the thermistor. A stable operating point is reached at which the voltage $V_A$ at point A is relatively constant.

When air flows across the thermistor RT1 the temperature of the thermistor decreases and thus the resistance of the thermistor decreases which causes the voltage $V_A$ to increase. When the thermistor RT1 is in still air, the temperature and resistance of the thermistor increases which causes the voltage $V_A$ to decrease.

The voltage $V_A$ is applied to pin 2 of a comparator U1A. A reference voltage $V_{REF}$ is applied to pin 3 of the comparator U1A. The reference voltage $V_{REF}$ is set at a predetermined value so that when RT1 is in still air $V_{REF}>V_A$ and the output of pin 1 of the comparator U1A is high (similar to $V_{CC}$). When air flows across RT1, $V_{REF}<V_A$ and the output of pin 1 of the comparator U1A is low (about 0 volts). The reference voltage $V_{REF}$ can be set so that the output of the comparator output U1A pin 1 switches over at a predetermined air flow. The comparator output is connected to a second resistor R2 and an LED L1.

Power is supplied to the electrostatic air cleaner 10 from the voltage $V_{DD}$ applied at point B to the power supply connection 30 for the air cleaner through a relay S1. Point B is also connected to an inductor coil K1 which is in turn connected through connectors J1 and P1 to a photo-transistor PT1 positioned opposite the LED L1. The photo-transistor PT1 and the LED L1 may be formed as a single integral unit.

In operation, when the thermistor RT1 is in still air the thermistor heats up and causes $V_A$ to be low. Since $V_{REF}>V_A$, the output of comparator U1A pin 1 is high which causes current to flow through the resistor R2 and activates the LED L1. The LED L1 in turn activates the photo-transistor PT1 causing current to flow through the inductor coil K1 energizing the relay S1. The energized relay S1 causes the voltage $V_{DD}$ to be cut-off from the power supply connection 30 for the air cleaner 10, thus turning off the power of the air cleaner.

When the thermistor RT1 is cooled by air being drawn into the air cleaner through the opening, $V_{REF}<V_A$ and the output of the comparator U1A pin 1 is low. Therefore, no current flows through the second resistor R2 and the LED L1 and photo-transistor PT1 are not activated. The inductor coil K1 has no current flowing through it and the relay is de-energized. The voltage $V_{DD}$ is therefore applied to the electrostatic air cleaner through the power supply 30.

The connectors J1 and P1 are provided so that the air flow sensor circuit 20 may be easily disconnected from the electrostatic air cleaner 10. This is useful for use of an air cleaner with direct control heating systems in which the electrostatic air cleaner is controlled directly by the heating and cooling system control to turn the air cleaner on and off at the same time as the heating and cooling system blower. The disconnection of the connectors J1 and P1 de-energizes the relay S1 and allows the voltage $V_{DD}$ to be applied to the power supply 30 of the electrostatic air cleaner. The air cleaner may then automatically respond to the heating and cooling system control with no further modification. The electrostatic air cleaner according to the present invention may be used both with direct control heating systems by disconnecting the sensor circuit and may also be used with nondirect control heating systems, which require an air flow sensor circuit.

In addition, the electrostatic air cleaner 10 according to the present invention will continue to operate if the sensor circuit 20 is disabled in ways other than disconnection of the connectors J1 and P1. For example, a failure of any of the electronic components in the sensor circuit that removes the current flow through the LED L1 and the photo-transistor PT1 will not prevent the operation of the electrostatic air cleaner. In addition, the failure of the voltage supply $V_{CC}$ to the thermistor RT1 and the comparator U1A will not prevent the air cleaner from operating. Thus, the air flow sensor circuit of the present invention is designed so that no loss of air cleaning function occurs when the sensor circuit is disabled in any of a variety of ways.

The advantages of the air flow sensor circuit according to the present invention include a simple and economical circuit which allows the air cleaner to continue to function if the sensor or the sensor circuit is disabled such as by failure, removal or disconnection.

While the invention has been described in detail with reference to a preferred embodiment thereof, it will be apparent to one of ordinary skill in the art that various changes can be made, and equivalents employed without departing from the spirit and scope of the invention.

What is claimed is:

1. An air cleaning system comprising:

an air cleaner for use in an air duct;

an air flow sensor circuit including an air flow sensor, said circuit connected to the air cleaner and having means for connecting the sensor to a power supply, said sensor providing a signal in response to airflow through the air duct; and switching means connected to the air flow sensor circuit and the air cleaner for controlling the power supply to the air cleaner in response to the signal provided by the sensor, the switching means supplying power to the air cleaner from the power supply when either the sensor or the circuit is disabled.

2. The air cleaning system of claim 1, wherein the sensor includes means for sensing an increase in temperature due to a lack of air flow through the duct.

3. The air cleaning system of claim 2, wherein the sensing means includes a thermistor mounted adjacent an opening from the air cleaner to the ambient air.

4. The air cleaning system of claim 3, wherein the thermistor senses a temperature change caused by air being drawn through the opening.

5. The air cleaning system of claim 1, wherein the switching means will supply power to the air cleaner from the power supply when the sensor circuit is removed from the air cleaner.

6. The air cleaning system of claim 1, wherein the switching means will supply power to the air cleaner from the power supply when the sensor circuit is disconnected from the air cleaner.

7. The air cleaning system of claim 1, wherein the switching means will supply power to the air cleaner from the power supply when the sensor circuit malfunctions.

8. The air cleaning system of claim 1, wherein the switching means includes a relay which is activated in response to the signal provided by the sensor.

9. The air cleaning system of claim 1, wherein the signal provided by the sensor is a sensor output voltage and the sensor circuit includes a comparator which compares the sensor output voltage to a reference voltage, wherein an output of the comparator is low when there is airflow through the duct and the output of the comparator is high when there is a lack of air flow through the duct.

10. The air cleaning system of claim 9, wherein the sensor circuit is provided with an LED and a photo-transistor connected to the switching means, wherein when the output of the comparator is high current flows through the LED and activates the photo-transistor causing the switching means to be energized to disconnect the air cleaner from the power supply.

11. The air cleaning system of claim 10, wherein the switching means includes a relay which is activated by a current flowing through an inductor coil.

12. The air cleaning system of claim 1, wherein the switching means receives either a high or a low signal from the air flow sensor circuit and the switching means provides power to the air cleaner in response to the low signal.

13. The air cleaner system of claim 12, wherein the low signal from the air flow sensor circuit is about zero volts.

14. The air cleaner system of claim 1, wherein the air cleaner is an electrostatic air cleaner.

15. An air cleaner control system comprising:

an air cleaner;

means for generating a high signal in the absence of an air flow and for generating a low signal in the presence of an air flow, wherein the means for generating high and low signals includes a means for producing an airflow sensor signal voltage and a comparator which compares said airflow sensor signal voltage to a predetermined reference signal voltage; and means responsive to the generating means for supplying power to the air cleaner when a low signal is generated by the generating means.

16. The air cleaner control system according to claim 15, wherein the means for generating includes a sensing means positioned adjacent an opening which allows ambient air to be drawn into the air cleaner.

17. The air cleaner control system according to claim 15, wherein said means responsive to the generating means supplies power to the air cleaner when the generating means is disabled.

18. The air cleaner control system according to claim 17, wherein the means responsive to the generating means includes a switch which controls the power supplied to the air cleaner dependent on the generating means.

* * * * *